United States Patent
Sheng (10) Patent No.: US 11,757,485 B2
(45) Date of Patent: Sep. 12, 2023

(54) RADIO FREQUENCY FRONT-END CIRCUIT AND MOBILE TERMINAL

(71) Applicant: VIVO MOBILE COMMUNICATION CO., LTD., Guangdong (CN)

(72) Inventor: Xuefeng Sheng, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 25 days.

(21) Appl. No.: 17/671,851

(22) Filed: Feb. 15, 2022

(65) Prior Publication Data

US 2022/0173764 A1    Jun. 2, 2022

Related U.S. Application Data

(63) Continuation of application No. PCT/CN2020/103318, filed on Jul. 21, 2020.

(30) Foreign Application Priority Data

Aug. 16, 2019    (CN) .......................... 201910757149.7

(51) Int. Cl.
*H04B 1/44*    (2006.01)
*H04B 7/0404*    (2017.01)

(52) U.S. Cl.
CPC .............. *H04B 1/44* (2013.01); *H04B 7/0404* (2013.01)

(58) Field of Classification Search
CPC . H04B 1/006; H04B 1/04; H04B 1/44; H04B 7/0602; H04B 7/0802; H04B 7/0404
See application file for complete search history.

(56) References Cited

U.S. PATENT DOCUMENTS

| | | | |
|---|---|---|---|
| 10,165,513 B1 | 12/2018 | Gorbachov et al. | |
| 10,211,860 B2 | 2/2019 | Cook | |
| 10,804,955 B2 * | 10/2020 | Sakurai | H04B 1/48 |
| 10,998,924 B2 * | 5/2021 | Tsuda | H04B 1/0064 |
| 2014/0141732 A1 | 5/2014 | Medapalli et al. | |
| 2019/0288718 A1 | 9/2019 | Bai | |
| 2020/0366323 A1 | 11/2020 | Tsuda et al. | |
| 2021/0288676 A1 | 9/2021 | Zhang | |
| 2022/0014229 A1 | 1/2022 | Hsieh et al. | |

FOREIGN PATENT DOCUMENTS

| | | |
|---|---|---|
| CN | 106656248 A | 5/2017 |
| CN | 206211999 U | 5/2017 |
| CN | 108462506 A | 8/2018 |
| CN | 108923791 A | 11/2018 |
| CN | 109039345 A | 12/2018 |
| CN | 109274397 A | 1/2019 |
| CN | 109490757 A | 3/2019 |

(Continued)

*Primary Examiner* — Nhan T Le
(74) *Attorney, Agent, or Firm* — Price Heneveld LLP (57) ABSTRACT

Embodiments of this disclosure provide a radio frequency front-end circuit and a mobile terminal. The radio frequency front-end circuit includes: a first transmit path, a first receive path, a second receive path, a third receive path, a fourth receive path, a double-pole four-throw switch, a first single-pole double-throw switch, a second single-pole double-throw switch, a third single-pole double-throw switch, a first antenna, a second antenna, a third antenna, and a fourth antenna.

11 Claims, 3 Drawing Sheets

(56) References Cited

FOREIGN PATENT DOCUMENTS

| | | |
|---|---|---|
| CN | 109639311 A | 4/2019 |
| CN | 109873664 A | 6/2019 |
| CN | 110504982 A | 11/2019 |
| EP | 1061662 B1 | 1/2006 |
| WO | 2019151528 A1 | 8/2019 |

\* cited by examiner

RADIO FREQUENCY FRONT-END CIRCUIT AND MOBILE TERMINAL

CROSS-REFERENCE TO RELATED APPLICATIONS

The present application is a bypass continuation application of International Application No. PCT/CN2020/103318 filed on Jul. 21, 2020, which claims priority to Chinese Patent Application No. 201910757149.7, filed in China on Aug. 16, 2019, which are incorporated herein by reference in their entireties.

TECHNICAL FIELD

Embodiments of this disclosure relate to the field of communications technologies, and in particular, to a radio frequency front-end circuit and a mobile terminal.

BACKGROUND

With the rapid development of Internet communication technology and the increasing popularization of smart mobile terminals, users have growing demands for data traffic. From transmission rates of 100 Mbit/s to 1 Gbit/s in 4G to a peak transmission rate up to 20 Gbit/s in 5G new radio (NR), people's demand for data transmission rates has been greatly satisfied. However, the increase in rates requires 5G to support the key technology of 4×4 multiple input multiple output (MIMO).

Figure 1:
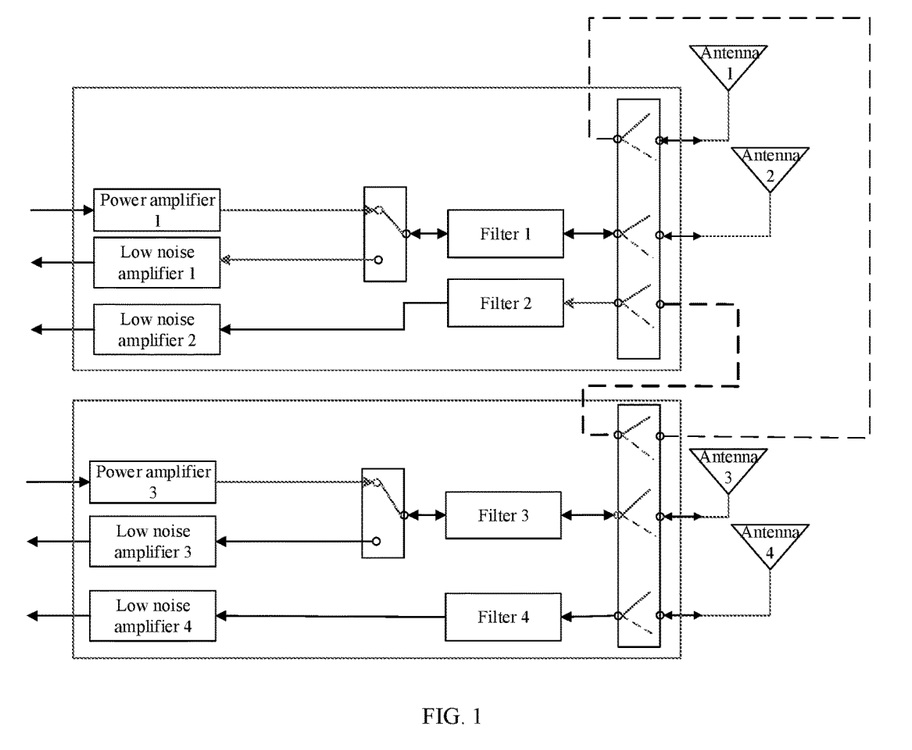
FIG. 1 is a schematic diagram of a radio frequency front-end circuit architecture in the related art.

FIG. 1 is a schematic structural diagram of a radio frequency front-end circuit in a 5G mobile terminal device. Such circuit architecture can implement one-transmit four-receive or two-transmit four-receive, that is, one transmitter and four receivers, or two transmitters and four receivers. A radio frequency front-end circuit in the related art has the following disadvantages:

1. In the case of high frequency and large bandwidth, a three-pole three-throw switch (namely 3P3T) has a large insertion loss. A higher frequency indicates a larger line loss of the 3P3T.

2. Because the 3P3T has many switching paths, the 3P3T isolation is insufficient. Consequently, a transmitted signal interferes with a received signal.

3. The structural shortcomings, large insertion loss, and poor isolation of the 3P3T make it much more difficult to design a 3P3T suitable for 5G NR systems. Improvements made to address this problem greatly increase the costs of the 3P3T, making the price much higher than that of a DPDT.

4. FIG. 1 shows a radio frequency front-end circuit in a 5G mobile terminal device in the related art. For existing components, wires shown by the two dotted lines between two 3P3T components need to be wound between two modules. However, a longer wiring on a circuit board means a higher frequency and a larger path loss. Wiring is also required across layers. All these will increase the path loss.

5. Due to the layout restriction of the two 3P3Ts and the relatively far distance from antenna ports, the loss of reception performance will be increased by 2 to 3 dB (signal strength reduces by about a half).

SUMMARY

Embodiments of this disclosure provide a radio frequency front-end circuit and a mobile terminal, to resolve the problem of complex structure design and large loss of a radio frequency front-end circuit of a 5G mobile terminal device in the related art.

To resolve the foregoing technical problem, the following solutions are used in this disclosure.

According to a first aspect, a radio frequency front-end circuit is provided, including:

a first transmit path, a first receive path, a second receive path, a third receive path, a fourth receive path, a first single-pole double-throw switch, a second single-pole double-throw switch, a third single-pole double-throw switch, a double-pole four-throw switch, a first antenna, a second antenna, a third antenna, and a fourth antenna, where a first movable terminal of the double-pole four-throw switch is connected to a movable terminal of the first single-pole double-throw switch, a first fixed terminal and a second fixed terminal of the first single-pole double-throw switch are connected to the first transmit path and the first receive path respectively, a second movable terminal of the double-pole four-throw switch is connected to the second receive path, a first fixed terminal of the double-pole four-throw switch is connected to the first antenna, and a second fixed terminal of the double-pole four-throw switch is connected to the second antenna;

a first fixed terminal of the second single-pole double-throw switch is connected to a third fixed terminal of the double-pole four-throw switch, a second fixed terminal of the second single-pole double-throw switch is connected to the third receive path, and a movable terminal of the second single-pole double-throw switch is connected to the third antenna; and a first fixed terminal of the third single-pole double-throw switch is connected to a fourth fixed terminal of the double-pole four-throw switch, a second fixed terminal of the third single-pole double-throw switch is connected to the fourth receive path, and a movable terminal of the third single-pole double-throw switch is connected to the fourth antenna.

According to a second aspect, a mobile terminal is provided, including the foregoing radio frequency front-end circuit.

The radio frequency front-end circuit provided in some embodiments of this disclosure supports switching of signal transmit and receive paths by using one double-pole four-throw switch and two single-pole double-throw switches (that is, the second single-pole double-throw switch and the third single-pole double-throw switch). In the radio frequency front-end circuit in some embodiments of this disclosure, it is unnecessary to deploy the lines shown by the dashed lines in FIG. 1, so that the line deployment is more compact, the line path is shorter, and the line insertion loss is reduced. In addition, the line connection of the radio frequency front-end circuit in some embodiments of this disclosure is simpler, which reduces the circuit design complexity and production costs. Moreover, the radio frequency front-end circuit in some embodiments of this disclosure uses the double-pole four-throw switch and single-pole double-throw switches in place of a three-pole three-throw switch. Compared with the three-pole three-throw switch, the double-pole four-throw switch and single-pole double-throw switches have lower cost and smaller component insertion loss. Further, the isolation of the double-pole four-throw switch and single-pole double-throw switches is better than that of the three-pole three-throw switch, so that transmitted signals can be better isolated from received signals, reducing the interference of the transmitted signals to the received signals.

Still further, the radio frequency front-end circuit in some embodiments of this disclosure is designed to allow a device in the third receive path and the second single-pole double-throw switch, as well as a device in the fourth receive path and the third single-pole double-throw switch, to be deployed near an antenna side, to improve reception performance while reducing the use of external radio frequency lines (that is, RF cables). The reduced use of RF cables can also reduce radio frequency sockets used with the RF cables, thereby reducing the layout area and production costs.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

Embodiment 1

Figure 2:
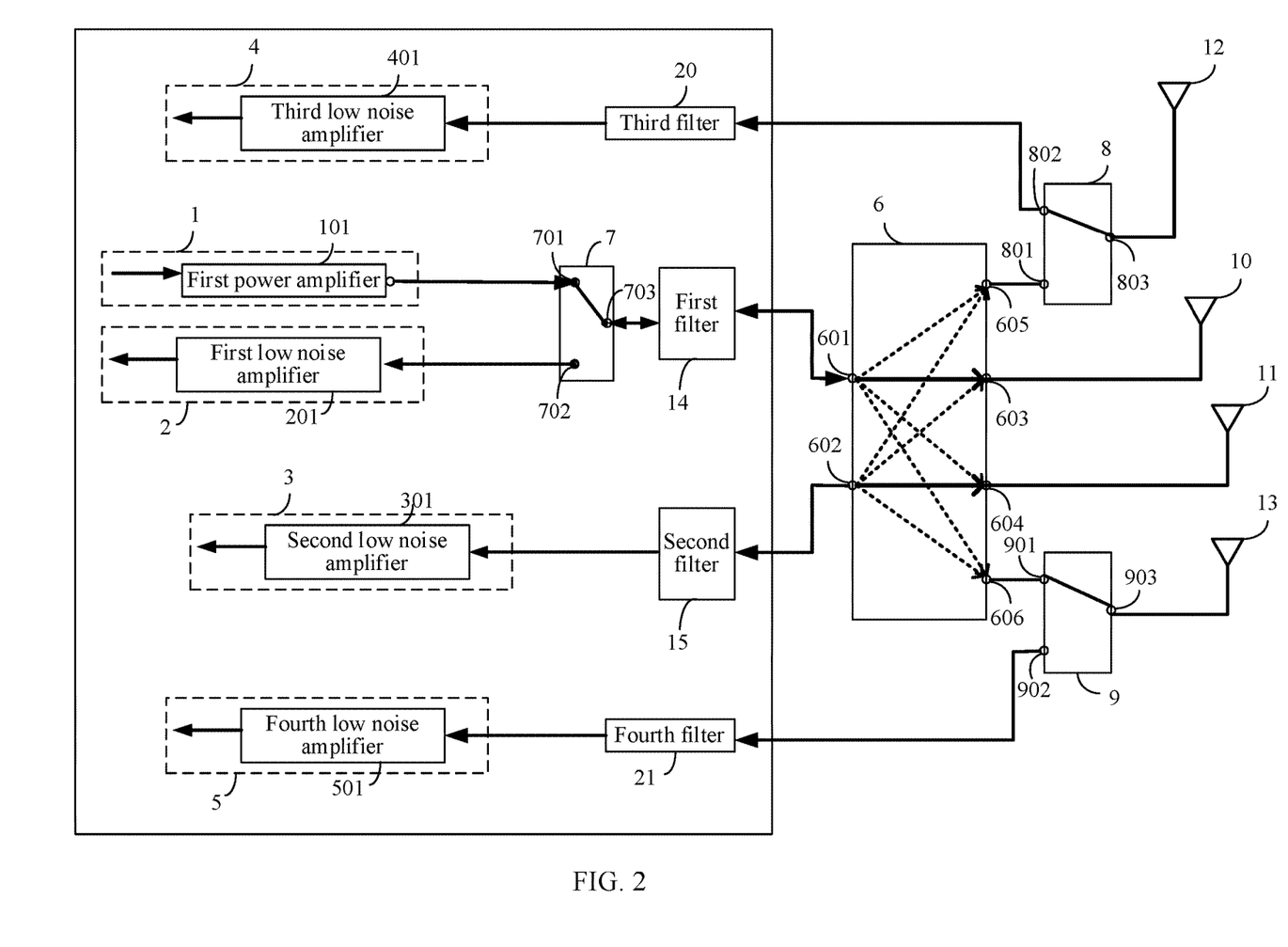
FIG. 2 is a first schematic structural diagram of a radio frequency front-end circuit architecture according to some embodiments of this disclosure.

Some embodiments of this disclosure provide a radio frequency front-end circuit. As shown in FIG. 2, the radio frequency front-end circuit includes: a first transmit path 1, a first receive path 2, a second receive path 3, a third receive path 4, a fourth receive path 5, a double-pole four-throw switch 6, a first single-pole double-throw switch 7, a second single-pole double-throw switch 8, a third single-pole double-throw switch 9, a first antenna 10, a second antenna 11, a third antenna 12, and a fourth antenna 13.

A first movable terminal 601 of the double-pole four-throw switch 6 is connected to a movable terminal 703 of the first single-pole double-throw switch 7, and a first fixed terminal 701 and a second fixed terminal 702 of the first single-pole double-throw switch 7 are connected to the first transmit path 1 and the first receive path 2 respectively. A second movable terminal 602 of the double-pole four-throw switch 6 is connected to the second receive path 3. A first fixed terminal 603 of the double-pole four-throw switch 6 is connected to the first antenna 10, a second fixed terminal 604 of the double-pole four-throw switch 6 is connected to the second antenna 11, a third fixed terminal 605 of the double-pole four-throw switch 6 is connected to a first fixed terminal 801 of the second single-pole double-throw switch 8, and a fourth fixed terminal 606 of the double-pole four-throw switch 6 is connected to a first fixed terminal 901 of the third single-pole double-throw switch 9.

The first fixed terminal 801 of the second single-pole double-throw switch 8 is connected to the third fixed terminal 605 of the double-pole four-throw switch 6, a second fixed terminal 802 of the second single-pole double-throw switch 8 is connected to the third receive path 4, and a movable terminal 803 of the second single-pole double-throw switch 8 is connected to the third antenna 12.

The first fixed terminal 901 of the third single-pole double-throw switch 9 is connected to the fourth fixed terminal 606 of the double-pole four-throw switch 6, a second fixed terminal 902 of the third single-pole double-throw switch 9 is connected to the fourth receive path 5, and the movable terminal 903 of the third single-pole double-throw switch 9 is connected to the fourth antenna 13.

It should be noted that for the double-pole four-throw switch 6, a pole on either of the first movable terminal and the second movable terminal can be switched to any one of the first fixed terminal to the fourth fixed terminal.

As shown in FIG. 2, the first transmit path 1 may transmit a signal by using the first antenna 10 or the second antenna 11 through the first single-pole double-throw switch 7 and the double-pole four-throw switch 6; or transmit a signal by using the third antenna 12 through the first single-pole double-throw switch 7, the double-pole four-throw switch 6, and the second single-pole double-throw switch 8; or transmit a signal by using the fourth antenna 13 through the first single-pole double-throw switch 7, the double-pole four-throw switch 6, and the third single-pole double-throw switch 9.

As shown in FIG. 2, the first receive path 2 may receive a signal by using the first antenna 10 or the second antenna 11 through the double-pole four-throw switch 6 and the first single-pole double-throw switch 7; or receive a signal by using the third antenna 12 through the second single-pole double-throw switch 8, the double-pole four-throw switch 6, and the first single-pole double-throw switch 7; or receive a signal by using the fourth antenna 13 through the third single-pole double-throw switch 9, the double-pole four-throw switch 6, and the first single-pole double-throw switch 7.

As shown in FIG. 2, the second receive path 3 may receive a signal by using the first antenna 10 or the second antenna 11 through the double-pole four-throw switch 6; or receive a signal by using the third antenna 12 through the second single-pole double-throw switch 8 and the double-pole four-throw switch 6; or receive a signal by using the fourth antenna 13 through the third single-pole double-throw switch 9 and the double-pole four-throw switch 6.

As shown in FIG. 2, the third receive path 4 may receive a signal by using the third antenna 12 through the second single-pole double-throw switch 8.

As shown in FIG. 2, the fourth receive path 5 may receive a signal by using the fourth antenna 13 through the third single-pole double-throw switch 9.

The radio frequency front-end circuit provided in some embodiments of this disclosure supports switching of signal transmit and receive paths by using one double-pole four-throw switch and two single-pole double-throw switches (that is, the second single-pole double-throw switch 8 and the third single-pole double-throw switch 9). As seen from FIG. 2, in the radio frequency front-end circuit in some embodiments of this disclosure, it is unnecessary to deploy the lines shown by the dashed lines in FIG. 1, so that the line deployment is more compact, the line path is shorter, and the line insertion loss is reduced. In addition, the line connection of the radio frequency front-end circuit in some embodiments of this disclosure is simpler, which reduces the circuit design complexity and production costs. Moreover, the radio frequency front-end circuit in some embodiments of this disclosure uses the double-pole four-throw switch and single-pole double-throw switches in place of a three-pole three-throw switch. Compared with the three-pole three-throw switch, the double-pole four-throw switch and single-pole double-throw switches have lower cost and smaller component insertion loss. Further, the isolation of the double-pole four-throw switch and single-pole double-throw switches is better than that of the three-pole three-throw switch, so that transmitted signals can be better isolated from received signals, reducing the interference of the transmitted signals to the received signals.

Still further, the radio frequency front-end circuit in some embodiments of this disclosure is designed to allow a device in the third receive path 4 and the second single-pole double-throw switch 8, as well as a device in the fourth receive path 5 and the third single-pole double-throw switch 9 to be deployed near an antenna side, to improve reception performance while reducing the use of external radio frequency lines (that is, RF cables). The reduced use of RF cables can also reduce radio frequency sockets used with the RF cables, thereby reducing the layout area and production costs.

Embodiment 2

Some embodiments of this disclosure provide a radio frequency front-end circuit. As shown in FIG. 2, the radio frequency front-end circuit includes: a first transmit path 1, a first receive path 2, a second receive path 3, a third receive path 4, a fourth receive path 5, a double-pole four-throw switch 6, a first single-pole double-throw switch 7, a second single-pole double-throw switch 8, a third single-pole double-throw switch 9, a first antenna 10, a second antenna 11, a third antenna 12, and a fourth antenna 13. The connection relationship between the foregoing structures is the same as that described in Embodiment 1, and is not repeated herein.

As shown in FIG. 2, the first transmit path 1 includes at least: a first power amplifier 101 connected to a first fixed terminal 701 of the first single-pole double-throw switch 7. The first receive path 2 includes at least: a first low noise amplifier 201 connected to a second fixed terminal 702 of the first single-pole double-throw switch 7. A movable terminal 703 of the first single-pole double-throw switch 7 is connected to a first movable terminal 601 of the double-pole four-throw switch 6.

When a pole on a movable terminal 703 of the first single-pole double-throw switch 7 is switched to the first fixed terminal of the first single-pole double-throw switch 7, the first transmit path 1 can transmit a signal; when the pole on the movable terminal of the first single-pole double-throw switch 7 is switched to the second fixed terminal of the first single-pole double-throw switch 7, the first receive path 2 can receive a signal.

When a pole on the first movable terminal of the double-pole four-throw switch is switched to a first fixed terminal of the double-pole four-throw switch, the first transmit path 1 can transmit a signal by using the first antenna 10, and the first receive path 2 can receive a signal by using the first antenna 10; when the pole on the first movable terminal 601 of the double-pole four-throw switch 6 is switched to a second fixed terminal 604 of the double-pole four-throw switch 6, the first transmit path 1 can transmit a signal by using the second antenna 11, and the first receive path 2 can receive a signal by using the second antenna 11; when the pole on the first movable terminal 601 of the double-pole four-throw switch 6 is switched to a third fixed terminal 605 of the double-pole four-throw switch 6, and a pole on a movable terminal 803 of the second single-pole double-throw switch 8 is switched to a first fixed terminal 801 of the second single-pole double-throw switch 8, the first transmit path 1 can transmit a signal by using the third antenna 12, and the first receive path 2 can receive a signal by using the third antenna 12; when the pole on the first movable terminal 601 of the double-pole four-throw switch 6 is switched to a fourth fixed terminal 606 of the double-pole four-throw switch 6, and a pole on a movable terminal 903 of the third single-pole double-throw switch 9 is switched to a first fixed terminal 901 of the third single-pole double-throw switch 9, the first transmit path 1 can transmit a signal by using the fourth antenna 13, and the first receive path 2 can receive a signal by using the fourth antenna 13.

Optionally, to filter an interference signal, the radio frequency front-end circuit further includes a first filter 14, as shown in FIG. 2.

The first filter 14 is disposed between the first single-pole double-throw switch 7 and the double-pole four-throw switch 6. Specifically, the first filter 14 is separately connected to the movable terminal 703 of the first single-pole double-throw switch 7 and the first movable terminal 601 of the double-pole four-throw switch 6.

Optionally, as shown in FIG. 2, the second receive path 3 includes at least: a second low noise amplifier 301 connected to the second movable terminal 602 of the double-pole four-throw switch 6.

When a pole on the second movable terminal 602 of the double-pole four-throw switch 6 is switched to a first fixed terminal 603 of the double-pole four-throw switch 6, the second receive path can receive a signal by using the first antenna 10; when the pole on the second movable terminal 602 of the double-pole four-throw switch 6 is switched to the second fixed terminal 604 of the double-pole four-throw switch 6, the second receive path can receive a signal by using the second antenna 11; when the pole on the second movable terminal 602 of the double-pole four-throw switch 6 is switched to the third fixed terminal 605 of the double-pole four-throw switch 6, and the pole on the movable terminal 803 of the second single-pole double-throw switch 8 is switched to the first fixed terminal 801 of the second single-pole double-throw switch 8, the second receive path can receive a signal by using the third antenna 12; when the pole on the second movable terminal 602 of the double-pole four-throw switch 6 is switched to the fourth fixed terminal 606 of the double-pole four-throw switch 6, and the pole on the movable terminal 903 of the third single-pole double-throw switch 9 is switched to the first fixed terminal 901 of the third single-pole double-throw switch 9, the second receive path can receive a signal by using the fourth antenna 13.

Optionally, to filter an interference signal, the radio frequency front-end circuit further includes a second filter 15, as shown in FIG. 2.

The second filter 15 is disposed between the second low noise amplifier 301 and the double-pole four-throw switch 6. Specifically, the second filter 15 is separately connected to the second low noise amplifier 301 and the second movable terminal 602 of the double-pole four-throw switch 6.

Figure 3:
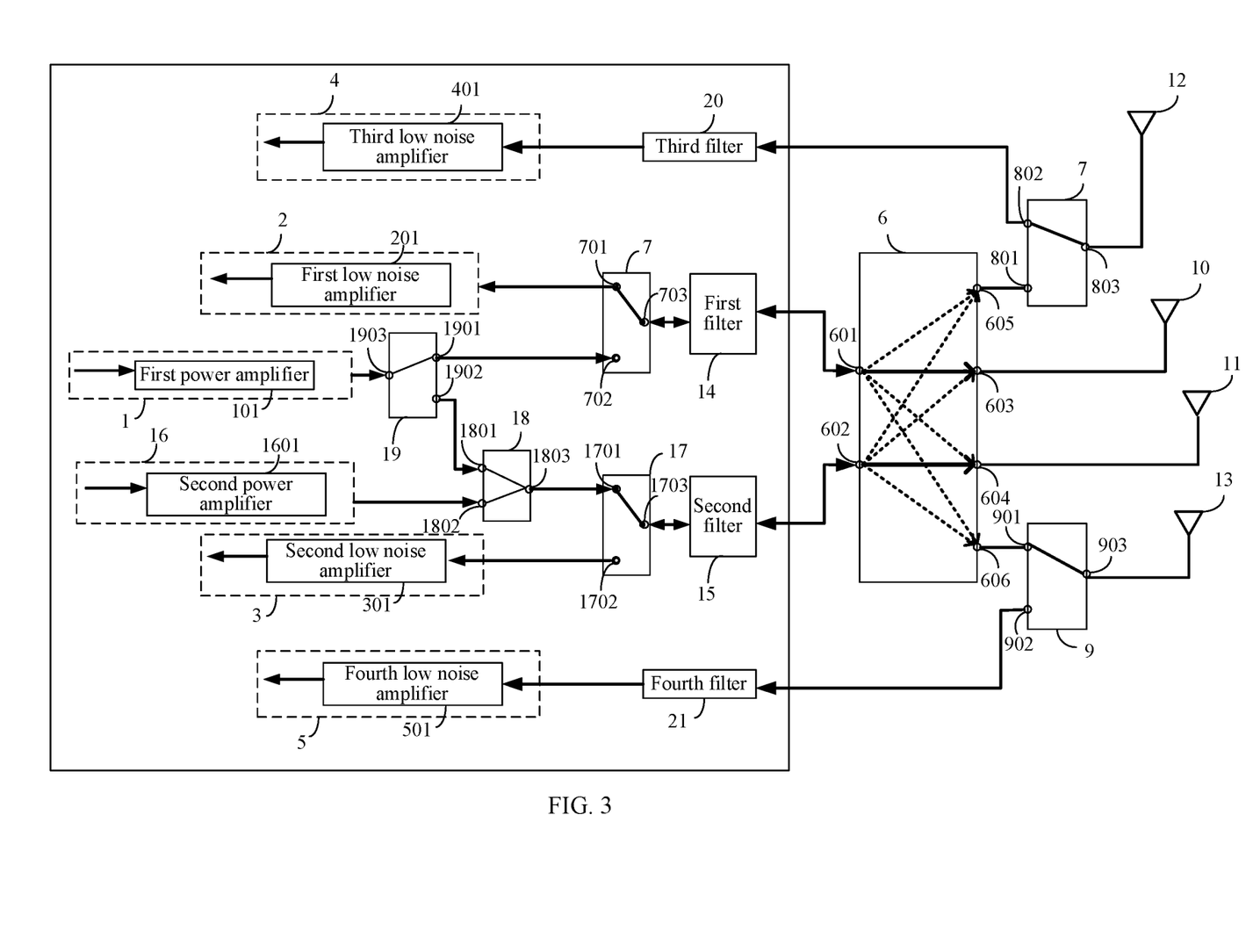
FIG. 3 is a second schematic structural diagram of a radio frequency front-end circuit architecture according to some embodiments of this disclosure.

Optionally, as shown in FIG. 3, in another implementation of some embodiments of this disclosure, the radio frequency front-end circuit further includes: a second transmit path 16. The radio frequency front-end circuit in this implementation can implement not only one-transmit four-receive (that is, one transmitter and four receivers), but also two-transmit four-receive (that is, two transmitters and four receivers).

The second transmit path 16 and the second receive path 3 are connected to the second movable terminal 602 of the double-pole four-throw switch 6 through a fourth single-pole double-throw switch 17 and the second filter 15, and the second filter 15 is separately connected to a movable terminal 1703 of the fourth single-pole double-throw switch 17 and the second movable terminal 602 of the double-pole four-throw switch 6.

When a pole on the movable terminal of the fourth single-pole double-throw switch is switched to a first fixed terminal of the fourth single-pole double-throw switch 17, the second transmit path can transmit a signal, and the second receive path 3 can receive a signal; when the pole on the movable terminal of the fourth single-pole double-throw switch 17 is switched to a second fixed terminal of the fourth single-pole double-throw switch 17, the second receive path can receive a signal.

When the pole on the second movable terminal 602 of the double-pole four-throw switch 6 is switched to the first fixed terminal 603 of the double-pole four-throw switch 6, the second transmit path can transmit a signal by using the first antenna 10, and the second receive path can receive a signal by using the first antenna 10; when the pole on the second movable terminal 602 of the double-pole four-throw switch 6 is switched to the second fixed terminal 604 of the double-pole four-throw switch 6, the second transmit path can transmit a signal by using the second antenna 11, and the second receive path can receive a signal by using the second antenna 11; when the pole on the second movable terminal 602 of the double-pole four-throw switch 6 is switched to the third fixed terminal 605 of the double-pole four-throw switch 6, and the pole on the movable terminal 803 of the second single-pole double-throw switch 8 is switched to the first fixed terminal 801 of the second single-pole double-throw switch 8, the second transmit path can transmit a signal by using the third antenna 12, and the second receive path can receive a signal by using the third antenna 12; when the pole on the second movable terminal 602 of the double-pole four-throw switch 6 is switched to the fourth fixed terminal 606 of the double-pole four-throw switch 6, and the pole on the movable terminal 903 of the third single-pole double-throw switch 9 is switched to the first fixed terminal 901 of the third single-pole double-throw switch 9, the second transmit path can transmit a signal by using the fourth antenna 13, and the second receive path can receive a signal by using the fourth antenna 13.

Optionally, as shown in FIG. 3, the second transmit path 16 includes at least: a second power amplifier 1601 connected to the first fixed terminal 1701 of the fourth single-pole double-throw switch 17. The second low noise amplifier 301 in the second receive path 3 is connected to the second fixed terminal 1702 of the fourth single-pole double-throw switch 17.

Optionally, as shown in FIG. 2 and FIG. 3, the radio frequency front-end circuit further includes: a power combiner 18 (Power Combiner).

The first power amplifier 101 is connected to the power combiner 18 through a fifth single-pole double-throw switch 19, a movable terminal 1903 of the fifth single-pole double-throw switch 19 is connected to the first power amplifier 101, a first fixed terminal 1901 of the fifth single-pole double-throw switch 19 is connected to the second fixed terminal 702 of the first single-pole double-throw switch 7, a second fixed terminal 1902 of the fifth single-pole double-throw switch 19 is connected to a first input terminal 1801 of the power combiner 18, the second power amplifier is connected to a second input terminal 1802 of the power combiner 18, and an output terminal 1803 of the power combiner 18 is connected to the first fixed terminal 1701 of the fourth single-pole double-throw switch 17.

In this implementation, the power combiner 18 is disposed in the radio frequency front-end circuit, to combine power of the first power amplifier 101 and power of the second power amplifier 1601 to generate higher power, so as to achieve a high power UE (HPUE).

Optionally, as shown in FIG. 2 and FIG. 3, the third receive path 4 includes at least: a third low noise amplifier 401 connected to a second fixed terminal of the second single-pole double-throw switch 8.

The movable terminal 803 of the second single-pole double-throw switch 8 is switched to the second fixed terminal 802 of the second single-pole double-throw switch 8, the third receive path 4 can receive a signal by using the third antenna 12.

Optionally, to filter an interference signal, the radio frequency front-end circuit further includes a third filter 20, as shown in FIG. 2 and FIG. 3.

The third filter 20 is disposed between the third low noise amplifier 401 and the second single-pole double-throw switch 8. Specifically, the third filter 20 is separately connected to the third low noise amplifier 401 and the second fixed terminal of the second single-pole double-throw switch 8.

Optionally, as shown in FIG. 2 and FIG. 3, the fourth receive path 5 includes at least: a fourth low noise amplifier 501 connected to a second fixed terminal of the third single-pole double-throw switch 9.

The movable terminal 903 of the third single-pole double-throw switch 9 is switched to a second fixed terminal 902 of the third single-pole double-throw switch 9, the fourth receive path 5 can receive a signal by using the fourth antenna 13.

Optionally, to filter an interference signal, the radio frequency front-end circuit further includes a fourth filter 21, as shown in FIG. 2 and FIG. 3.

The fourth filter 21 is disposed between the fourth low noise amplifier 501 and the third single-pole double-throw switch 9. Specifically, the fourth filter 21 is separately connected to the fourth low noise amplifier 501 and the second fixed terminal of the third single-pole double-throw switch 9.

Further, the radio frequency front-end circuit in some embodiments of this disclosure is designed to allow the third low noise amplifier 401 and the second single-pole double-throw switch 8, as well as the fourth low noise amplifier 501 and the third single-pole double-throw switch 9 to be deployed near an antenna side.

As seen from a calculation formula of receiver sensitivity: Sen (dBm)=−174 dBm/Hz+NF+10 log B+SNR, a larger value of NF indicates a poorer reception performance. In some embodiments of this disclosure, the third low noise amplifier 401 and the second single-pole double-throw switch 8, as well as the fourth low noise amplifier 501 and the third single-pole double-throw switch 9, can be deployed near the antenna side. Then, according to a calculation formula of NF: $NF_{total}=NF_1+(NF_2-1)/G_1+(NF_3-1)/G_1G_2+(NF_4-1)/G_1G_2G_3+\ldots$, when the low noise amplifier is deployed closer to the antenna, a value of $G_1$ is larger, and a larger value of $G_1$ indicates a smaller NF and a better reception performance. Therefore, the reception performance can also be greatly improved with reduced RF cables and costs.

Sen (dBm) represents the receiver sensitivity, NF represents a noise figure, B represents bandwidth, and SNR represents a signal-to-noise ratio. $NF_{total}$ represents a total noise figure, $NF_1$, $NF_2$, $NF_3$, $NF_4$, ... represent noise figures of various stages, and $G_1$, $G_2$, $G_3$ ... represent gains of low noise amplifiers at various stages.

The radio frequency front-end circuit provided in some embodiments of this disclosure supports switching of signal transmit and receive paths by using one double-pole four-throw switch and two single-pole double-throw switches (that is, the second single-pole double-throw switch 8 and the third single-pole double-throw switch 9). In the radio frequency front-end circuit in some embodiments of this disclosure, it is unnecessary to deploy the lines shown by the dashed lines in FIG. 1, so that the line deployment is more compact, the line path is shorter, and the line insertion loss is reduced. In addition, the line connection of the radio frequency front-end circuit in some embodiments of this disclosure is simpler, which reduces the circuit design complexity and production costs. Moreover, the radio frequency front-end circuit in some embodiments of this disclosure uses the double-pole four-throw switch and single-pole double-throw switches in place of a three-pole three-throw switch. Compared with the three-pole three-throw switch, the double-pole four-throw switch and single-pole double-throw switches have lower cost and smaller component insertion loss. Further, the isolation of the double-pole four-throw switch and single-pole double-throw switches is better than that of the three-pole three-throw switch, so that transmitted signals can be better isolated from received signals, reducing the interference of the transmitted signals to the received signals.

Still further, the radio frequency front-end circuit in some embodiments of this disclosure is designed to allow a device in the third receive path 4 and the second single-pole double-throw switch 8, as well as a device in the fourth receive path 5 and the third single-pole double-throw switch 9 to be deployed near an antenna side, to improve reception performance while reducing the use of external radio frequency lines (that is, RF cables). The reduced use of RF cables can also reduce radio frequency sockets used with the RF cables, thereby reducing the layout area and production costs.

According to another aspect of some embodiments of this disclosure, a mobile terminal is provided, including the foregoing radio frequency front-end circuit.

Optionally, the radio frequency front-end circuit further includes a controller. The controller is configured to control the first single-pole double-throw switch 7, the second single-pole double-throw switch 8, the third single-pole double-throw switch 9, the fourth single-pole double-throw switch 17, the fifth single-pole double-throw switch 19, and the double-pole four-throw switch 6.

The radio frequency front-end circuit in the mobile terminal provided in some embodiments of this disclosure supports switching of signal transmit and receive paths by using one double-pole four-throw switch and two single-pole double-throw switches (that is, the second single-pole double-throw switch 8 and the third single-pole double-throw switch 9). In the radio frequency front-end circuit in some embodiments of this disclosure, it is unnecessary to deploy the lines shown by the dashed lines in FIG. 1, so that the line deployment is more compact, the line path is shorter, and the line insertion loss is reduced. In addition, the line connection of the radio frequency front-end circuit in some embodiments of this disclosure is simpler, which reduces the circuit design complexity and production costs. Moreover, the radio frequency front-end circuit in some embodiments of this disclosure uses the double-pole four-throw switch and single-pole double-throw switches in place of a three-pole three-throw switch. Compared with the three-pole three-throw switch, the double-pole four-throw switch 6 and single-pole double-throw switches have lower cost and smaller component insertion loss. Further, the isolation of the double-pole four-throw switch and single-pole double-throw switches is better than that of the three-pole three-throw switch, so that transmitted signals can be better isolated from received signals, reducing the interference of the transmitted signals to the received signals.

Still further, the radio frequency front-end circuit in some embodiments of this disclosure is designed to allow a device in the third receive path 4 and the second single-pole double-throw switch 8, as well as a device in the fourth receive path 5 and the third single-pole double-throw switch 9 to be deployed near an antenna side, to improve reception performance while reducing the use of external radio frequency lines (that is, RF cables). The reduced use of RF cables can also reduce radio frequency sockets used with the RF cables, thereby reducing the layout area and production costs.

In the descriptions of this disclosure, it should be understood that the orientations or positional relationships indicated by the terms "center", "vertical", "transverse", "length", "width", "thickness", "upper", "lower", "front", "rear", "left", "right", "perpendicular", "horizontal", "top", "bottom", "inside", "outside", and the like are based on the orientations or positional relationships shown in the accompanying drawings, are merely intended to facilitate the descriptions of this disclosure and simplify the descriptions, are not intended to indicate or imply that the apparatuses or components mentioned in this application must have specific orientations, or be constructed and operated for a specific orientation, and therefore shall not be construed as a limitation to this disclosure.

In addition, the terms "first" and "second" are merely intended for a purpose of description, and shall not be understood as an indication or implication of relative importance or an implicit indication of the number of the indicated technical features. Therefore, a feature limited by "first" or "second" may explicitly or implicitly include one or more features. In the description of this disclosure, the meaning of "plurality" is at least two, for example two or three, unless otherwise specifically defined.

In this disclosure, unless otherwise clearly specified and limited, meanings of terms "install", "connected with", "connected to", and "fasten" should be understood in a board sense. For example, the connection may be a fixed connection, a removable connection, or an integral connection; may be a mechanical connection, an electrical connection, or mutual communication; may be a direct connection or an indirect connection by using an intermediate medium; or may be intercommunication between two components or interaction between two components. A person of ordinary skill in the art can understand specific meanings of these terms in this disclosure based on specific situations.

In this disclosure, unless otherwise clearly specified and limited, that a first feature is "above" or "below" a second feature may include that the first and second features are in direct contact, and may also include that the first and second features are in contact through another feature between them rather than direct contact. Moreover, that the first feature is "on", "above", or "on top of" the second feature includes that the first feature is directly and obliquely above the second feature, or only indicates that the level of the first feature is higher than the level of the second feature. That the first feature is "under", "below", or "beneath" the second feature includes that the first feature is directly and obliquely below the second feature, or only indicates that the level of the first feature is lower than the level of the second feature.

All embodiments in this specification are described in a progressive manner. Each embodiment focuses on differences from other embodiments. For the part that is the same or similar between different embodiments, reference may be made between the embodiments.

Although optional embodiments in some embodiments of this disclosure have been described, persons skilled in the art can make changes and modifications to these embodiments once they learn the basic inventive concept. Therefore, the following claims are intended to be construed as to cover the optional embodiments and all changes and modifications falling within the scope of some embodiments of this disclosure.

Finally, it should be noted that in this specification, relational terms such as first and second are used only to differentiate an entity or operation from another entity or operation, and do not necessarily require or imply that any actual relationship or sequence exists between these entities or operations. Moreover, the terms "include", "comprise", or their any other variants are intended to cover a non-exclusive inclusion, so that a process, a method, an article, or a terminal device that includes a list of elements not only includes those elements but also includes other elements that are not expressly listed, or further includes elements inherent to such a process, method, article, or terminal device. In absence of more constraints, an element preceded by "includes a . . . " does not preclude the existence of other identical elements in the process, method, article, or terminal device that includes the element.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A radio frequency front-end circuit, comprising:
a first transmit path, a first receive path, a second receive path, a third receive path, a fourth receive path, a first single-pole double-throw switch, a second single-pole double-throw switch, a third single-pole double-throw switch, a double-pole four-throw switch, a first antenna, a second antenna, a third antenna, and a fourth antenna, wherein
a first movable terminal of the double-pole four-throw switch is connected to a movable terminal of the first single-pole double-throw switch, a first fixed terminal and a second fixed terminal of the first single-pole double-throw switch are connected to the first transmit path and the first receive path respectively, a second movable terminal of the double-pole four-throw switch is connected to the second receive path, a first fixed terminal of the double-pole four-throw switch is connected to the first antenna, and a second fixed terminal of the double-pole four-throw switch is connected to the second antenna;
a first fixed terminal of the second single-pole double-throw switch is connected to a third fixed terminal of the double-pole four-throw switch, a second fixed terminal of the second single-pole double-throw switch is connected to the third receive path, and a movable terminal of the second single-pole double-throw switch is connected to the third antenna; and
a first fixed terminal of the third single-pole double-throw switch is connected to a fourth fixed terminal of the double-pole four-throw switch, a second fixed terminal of the third single-pole double-throw switch is connected to the fourth receive path, and a movable terminal of the third single-pole double-throw switch is connected to the fourth antenna;
the radio frequency front-end circuit further comprises a second filter, wherein the second filter is separately connected to the second receive path and the second movable terminal of the double-pole four-throw switch;
the radio frequency front-end circuit further comprises a second transmit path, wherein
the second transmit path and the second receive path are connected to the second movable terminal of the double-pole four-throw switch through a fourth single-pole double-throw switch and the second filter; and the second filter is separately connected to a movable terminal of the fourth single-pole double-throw switch and the second movable terminal of the double-pole four-throw switch.

2. The radio frequency front-end circuit according to claim 1, wherein the first transmit path comprises at least: a first power amplifier connected to the first fixed terminal of the first single-pole double-throw switch; and
the first receive path comprises at least: a first low noise amplifier connected to the second fixed terminal of the first single-pole double-throw switch.

3. The radio frequency front-end circuit according to claim 2, wherein the second receive path comprises at least: a second low noise amplifier connected to the second movable terminal of the double-pole four-throw switch.

4. The radio frequency front-end circuit according to claim 3, wherein the second transmit path comprises at least: a second power amplifier connected to a first fixed terminal of the fourth single-pole double-throw switch; and
the second low noise amplifier in the second receive path is connected to a second fixed terminal of the fourth single-pole double-throw switch.

5. The radio frequency front-end circuit according to claim 4, further comprising: a power combiner, wherein
the first power amplifier is connected to the power combiner through a fifth single-pole double-throw switch; and
a movable terminal of the fifth single-pole double-throw switch is connected to the first power amplifier, a first fixed terminal of the fifth single-pole double-throw switch is connected to the second fixed terminal of the first single-pole double-throw switch, and a second fixed terminal of the fifth single-pole double-throw switch is connected to a first input terminal of the power combiner;
the second power amplifier is connected to a second input terminal of the power combiner; and an output terminal of the power combiner is connected to the first fixed terminal of the fourth single-pole double-throw switch.

6. The radio frequency front-end circuit according to claim 1, further comprising a first filter, wherein the first filter is separately connected to the movable terminal of the first single-pole double-throw switch and the first movable terminal of the double-pole four-throw switch.

7. The radio frequency front-end circuit according to claim 1, wherein the third receive path comprises at least: a third low noise amplifier connected to the second fixed terminal of the second single-pole double-throw switch.

8. The radio frequency front-end circuit according to claim 7, further comprising a third filter, wherein the third filter is separately connected to the third low noise amplifier and the second fixed terminal of the second single-pole double-throw switch.

9. The radio frequency front-end circuit according to claim 1, wherein the fourth receive path comprises at least: a fourth low noise amplifier connected to the second fixed terminal of the third single-pole double-throw switch.

10. The radio frequency front-end circuit according to claim 9, further comprising a fourth filter, wherein the fourth filter is separately connected to the fourth low noise amplifier and the second fixed terminal of the third single-pole double-throw switch.

11. A mobile terminal, comprising the radio frequency front-end circuit according to claim 1.

\* \* \* \* \*